(12) United States Patent  (10) Patent No.: US 8,104,772 B2
Halling  (45) Date of Patent: Jan. 31, 2012

(54) GAS TURBINE NOZZLE SEALS FOR 2000° F. GAS CONTAINMENT

(75) Inventor: Horace P. Halling, Durham, CT (US)

(73) Assignee: Seal Science & Technology, LLC, Durham, CT (US)

( * ) Notice: Subject to any disclaimer, the term of this patent is extended or adjusted under 35 U.S.C. 154(b) by 417 days.

(21) Appl. No.: 12/490,027

(22) Filed: Jun. 23, 2009

(65) Prior Publication Data

US 2009/0322036 A1 Dec. 31, 2009

Related U.S. Application Data

(60) Provisional application No. 61/076,388, filed on Jun. 27, 2008.

(51) Int. Cl.
*H02G 3/22* (2006.01)
*F16L 17/06* (2006.01)
*F16J 15/02* (2006.01)

(52) U.S. Cl. ........ 277/606; 277/608; 277/609; 277/630; 277/637

(58) Field of Classification Search .................. 277/606, 277/608, 609, 616, 626, 627, 630, 637, 644
See application file for complete search history.

(56) References Cited

U.S. PATENT DOCUMENTS

| | | | |
|---|---|---|---|
| 582,022 A | 5/1897 | Nixon | |
| 1,032,761 A | 7/1912 | Miller | |
| 1,516,397 A | 11/1924 | Mueller et al. | |
| 1,866,160 A | 7/1932 | Griswold, Jr. | |
| 1,965,273 A | 7/1934 | Wilson | |
| 1,979,141 A * | 10/1934 | Clark et al. | 277/626 |
| 2,452,469 A | 10/1948 | Johnson | |
| 2,703,722 A | 3/1955 | Chirstophersen | |
| 2,876,024 A * | 3/1959 | Lorscheidt | 277/591 |
| 2,992,840 A | 7/1961 | Reynolds et al. | |
| 3,098,666 A | 7/1963 | Cain | |
| 3,259,406 A * | 7/1966 | Kish | 277/618 |
| 3,567,258 A | 3/1971 | Scaramucci | |
| 3,602,532 A | 8/1971 | Ehrenberg | |
| 3,630,553 A | 12/1971 | Foulger | |
| RE27,342 E | 4/1972 | Valenziano | |
| 3,797,836 A | 3/1974 | Halling | |
| 3,866,925 A | 2/1975 | Maimstrom et al. | |

(Continued)

FOREIGN PATENT DOCUMENTS

GB 2303888 A 3/1997

*Primary Examiner* — Vishal Patel
(74) *Attorney, Agent, or Firm* — DeLio & Peterson, LLC; Robert Curcio

(57) ABSTRACT

A seal for containment of fluids or gases during high temperature applications, separating a high pressure area on one side from a low pressure area on an opposite side, and formed to convert axial displacements into radial movements eliminating axial strains, having at least one engaging, conical ring structure with a tapering arcuate side facing radially away from the high pressure side. The conical ring structure has a side opposite the tapering side that is cylindrical, and a cylindrical diameter that is concentric with the arcuate side. The conical ring structure has an axial distal end with a larger diameter than its opposite end for engaging a flat annular surface on an adjacent structural member to form the seal. A heat-destructible wax spacer may be used for insertion within the clearance gap to locate the seal concentrically with the gland for ease of assembly.

7 Claims, 4 Drawing Sheets

U.S. PATENT DOCUMENTS

| | | |
|---|---|---|
| 4,109,942 A | 8/1978 | Morrill |
| 4,121,843 A | 10/1978 | Halling |
| 4,239,124 A * | 12/1980 | Inouye .......................... 220/240 |
| 4,282,643 A | 8/1981 | Yamasaki et al. |
| 4,299,332 A | 11/1981 | Pechacek |
| 4,324,407 A | 4/1982 | Upham et al. |
| 4,384,730 A | 5/1983 | Diehl |
| 4,614,371 A | 9/1986 | Bauder |
| 4,759,409 A | 7/1988 | Gullion |
| 4,850,521 A | 7/1989 | Servant |
| 4,943,273 A | 7/1990 | Pages |
| 5,117,066 A | 5/1992 | Balsells |
| 5,118,120 A | 6/1992 | Drerup et al. |
| 5,176,413 A | 1/1993 | Westman |
| 5,178,400 A * | 1/1993 | Singh ........................... 277/644 |
| 5,180,008 A | 1/1993 | Aldridge et al. |
| 5,730,445 A | 3/1998 | Swensen et al. |
| 5,791,657 A | 8/1998 | Cain et al. |
| 5,797,603 A | 8/1998 | Voirol et al. |
| 6,095,750 A | 8/2000 | Ross et al. |
| 6,164,663 A | 12/2000 | Turner |
| 6,209,884 B1 | 4/2001 | Taudt |
| 6,237,921 B1 | 5/2001 | Liotta et al. |
| 6,264,206 B1 | 7/2001 | Hashizawa et al. |
| 6,334,619 B1 * | 1/2002 | Dietle et al. .................. 277/559 |
| 6,406,066 B1 * | 6/2002 | Uegane ...................... 285/124.1 |
| 6,471,478 B1 | 10/2002 | Mashey |
| 6,510,895 B1 | 1/2003 | Koleilat et al. |
| 6,631,910 B2 | 10/2003 | Caplain et al. |
| 6,659,472 B2 | 12/2003 | Aksit et al. |
| 6,814,358 B2 | 11/2004 | Keck |
| 7,004,478 B2 | 2/2006 | Spence et al. |
| 7,083,171 B2 | 8/2006 | Oida et al. |
| 7,100,925 B2 | 9/2006 | Swensen et al. |
| 7,128,323 B2 | 10/2006 | Iguchi et al. |
| 7,201,381 B2 | 4/2007 | Halling |
| 7,726,339 B2 * | 6/2010 | Caprera ................... 137/625.33 |
| 7,730,839 B1 * | 6/2010 | Bender et al. ................. 102/501 |

* cited by examiner

GAS TURBINE NOZZLE SEALS FOR 2000° F. GAS CONTAINMENT

BACKGROUND OF THE INVENTION

1. Field of the Invention

The present invention relates to sealing capabilities for ultra-high temperature seals, and more specifically to seals for containment of gases between gas turbine nozzles (stators) immediately downstream of a combustion chamber, and inner and outer cooling air path structures typically ahead and aft of the nozzles.

2. Description of Related Art

Seals are generally used for containment of gases between cooling path structures and the working gas flow through turbine nozzles. The turbine nozzles direct combustion gases so that the turbine blades can perform work. The turbine nozzles, however, are subject to differences in thermal expansion with adjoining components due to the heated combustion gases. The prior art seals that help achieve gas containment are generally used at temperatures lower than those targeted for the present invention, i.e., lower than 2000° F. Generally, the prior art seals consist mainly of leaf-seals and seals formed as rings in tightly convoluted nickel and nickel-cobalt alloy butt-welded strip. The formed seals are subjected to high bending stresses when accommodating engine build tolerance accumulations and cyclic thermal movements. FIG. 1 depicts a cross-section of two prior art seals, such as those described in U.S. Pat. Nos. 5,118,120 and 6,095,750.

In U.S. Pat. No. 5,118,120 issued to Drerup, et al., on Jun. 2, 1992, entitled "LEAF SEALS," an apparatus for effecting a seal between two structural components of a turbo machine is taught, comprising a leaf seal located in the space between the two components and a spring which continuously biases the leaf seal into a sealing position against the components regardless of the pressure differential across the leaf seal.

Leaf seals are commonly employed to affect a substantially fluid-tight seal between abutting structural components in a turbo machine or other apparatus where a high-pressure area is present on one side of the structural component and a low-pressure area is present on the opposite side. FIG. 1 depicts a sectional view through a prior art turbine segment showing one nozzle blade 10 set between an inner band 11 and outer band 12 with terminating features of continuous annular components to either side. In the assembly of the majority of aircraft turbine engines today, the axis of rotation is vertical with respect to the base or first end, and the engine modules are built upward toward the second end of the engine. The view in FIG. 1 is a side view with the engine axis horizontal and its front end to the left. The seals in this figure comprise three leaf seal assemblies 13, 14 and 15, and one circular convoluted inner turbine seal ring 16.

The leaf seals of the prior art are depicted in FIG. 1. Each one is similar in construction. Leaf seal 13 is shown with an inner end 17 supported within a notch 18 formed in the vane forward outer rail 19, and an outer end 20 engageable with a combustor rear flange 22 (depicted for illustrative purposes by a triangular stop, but in actuality, a formed metal structure). Leaf seal 13 is slidably mounted on a threaded shoulder pin 24 connected and locked to the vane forward outer rail 19 by a nut 26. Leaf seal 13 is movable between a closed, sealed position, wherein its inner end 17 and outer end 20 engage the forward outer rail 19 and rear flange 22, respectively, as shown in FIG. 1, and an open position in which at least one of the ends 17, 20 of the leaf seal disengage a structural component. A biasing means 27, usually in the form of a spring, is mounted to one of the structural components and engages the leaf seal at a point intermediate the portions of the leaf seal that contact the structural components. The spring is effective to force the leaf seal against each structural component so as to maintain the leaf seal in a closed, sealed position.

In U.S. Pat. No. 6,095,750 issued to Ross, et al., on Aug. 1, 2000, entitled "TURBINE NOZZLE ASSEMBLY," a nozzle assembly is taught in which an outer band, an inner band, and at least two vanes disposed between the outer and inner bands are fabricated as a nozzle segment. As shown in FIG. 1, the arrangement for mounting the circular convoluted inner turbine seal ring 16 to the inner nozzle support 32 is depicted in more detail. The inner nozzle support 32 has at its axially and radially distal end, an annular radially outwardly extending aft mounting flange 34. An annularly radially outwardly extending forward mounting flange 36 is formed on the inner nozzle support 32, so as to form a gap with aft mounting flange 34. A retention flange 38 formed on the inner band 40 of the nozzle segment is disposed between the aft and forward mounting flanges. The inner nozzle support 32 positions the nozzle segment axially by virtue of the flow of combustion gases pressing the retention flange 38 against the aft mounting flange 34. The forward mounting flange 36 is provided to prevent forward movement of the nozzle segment in the unusual event of an engine stall.

These seals are known to be prone to distortion when used in connection with segmented nozzles having slightly varying heights. Even when new, leaf seals exhibit unwanted leakage, causing as much as a two (2) percent increase in fuel consumption compared to the initial performance of engines fitted with formed seal rings, which in some applications proved to have limited life due to failure by disintegration.

Furthermore, these prior art seals are generally produced in formable alloys and have been shown to be prone to stress relaxation at their maximum operating temperatures.

SUMMARY OF THE INVENTION

Bearing in mind the problems and deficiencies of the prior art, it is therefore an object of the present invention to provide a seal for containment of gases between gas turbine nozzles and cooling path structures that is not subject to high bending stresses.

It is another object of the present invention to provide a seal for containment of gases between gas turbine nozzles and cooling path structures that does not require significant forming, and may readily be produced in more heat-resistant, difficult-to-form alloys.

Still other objects and advantages of the invention will in part be obvious and will in part be apparent from the specification.

The above and other objects, which will be apparent to those skilled in the art, are achieved in the present invention which is directed to, in a first aspect, a seal for containment of gases during ultra high temperature operations between gas turbine nozzles downstream of a combustion chamber, separating a high pressure area on one side from a low pressure area on an opposite side, the seal formed to convert axial displacements into radial movements thereby eliminating axial strains, comprising two engaging, conical ring structures having cross-sections with a tapering arcuate side facing radially away from the high pressure side. Each of the conical ring structures may have a side opposite the tapering side that is cylindrical, having a cylindrical diameter that is concentric with the arcuate side. The arcuate side of the ring is dimensioned to engage a tapered sealing surface on the turbine nozzle segment.

The stated ultra high temperature applications include sealing in an environment having a temperature greater than or equal to 2000° F.

The seal preferably includes an axial distal end having a larger diameter than an opposite end for engaging a flat annular surface on an adjacent structural member to form the seal. The axial distal end may be crowned and approximately perpendicular to the ring axis.

A heat-destructible wax spacer may be added for insertion within a corresponding cylindrical diameter of the seal to aid in positioning during assembly. The wax spacer may be inserted with the seal within a groove in the gas turbine nozzle segment.

The sealing diameter to cross-section ratio for piston engine exhaust recirculation systems may be at least one order of magnitude lower than that of the turbine nozzle application.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-6 of the drawings in which like numerals refer to like features of the invention.

The instant invention presents a novel approach to accommodate axial displacements. This accommodation is realized through the elimination of axial strains, or more specifically through the conversion of axial displacements into radial movements. This conversion is preferably performed using two engaging, essentially conical, ring surfaces, in which the sealing ring member is a slender circular element, with the cooperating member being relatively substantial and rigid. Since the ring and sealing gland are comparatively large in relation to the ring cross-section, the radial strain produced through the conversion of the axial interference is small, as is the hoop stress induced within the ring. Thus, the sealing rings may be fabricated in materials whose properties, although being the best available today, would ordinarily not be suitable for accommodating the large axial displacements in bending.

In a preferred embodiment, the seals are typically rings, twenty (20) to forty (40) inches in diameter with solids of revolution cross-sections fitting inside a 3/16 inch square envelope. These cross-sections preferably have a tapering, usually on the arcuate side facing radially away from the higher pressure in the intended annular sealing application. The opposite sides, either inner or outer, are generally cylindrical. The arcuate-tapering side of the ring may be dimensioned to engage a tapered sealing surface on a turbine nozzle ring or arcuate nozzle segment. The cylindrical diameter is concentric with the arcuate surface and is dimensioned to ensure clearance with a structural member adjacent to the nozzle or the nozzle assembly. The seal must be sufficiently flexible to span steps of random depth between nozzle segments, preferably up to 0.004 inches deep. Even if the original segments are set up to be machined as a set, replacement segments would not be exactly identical because of tolerances that must be allowed in order for machining to be practicable and feasible. Preferably, a clearance is maintained between the cylindrical surfaces of the seal and the components forming the receiving gland.

Figure 1:
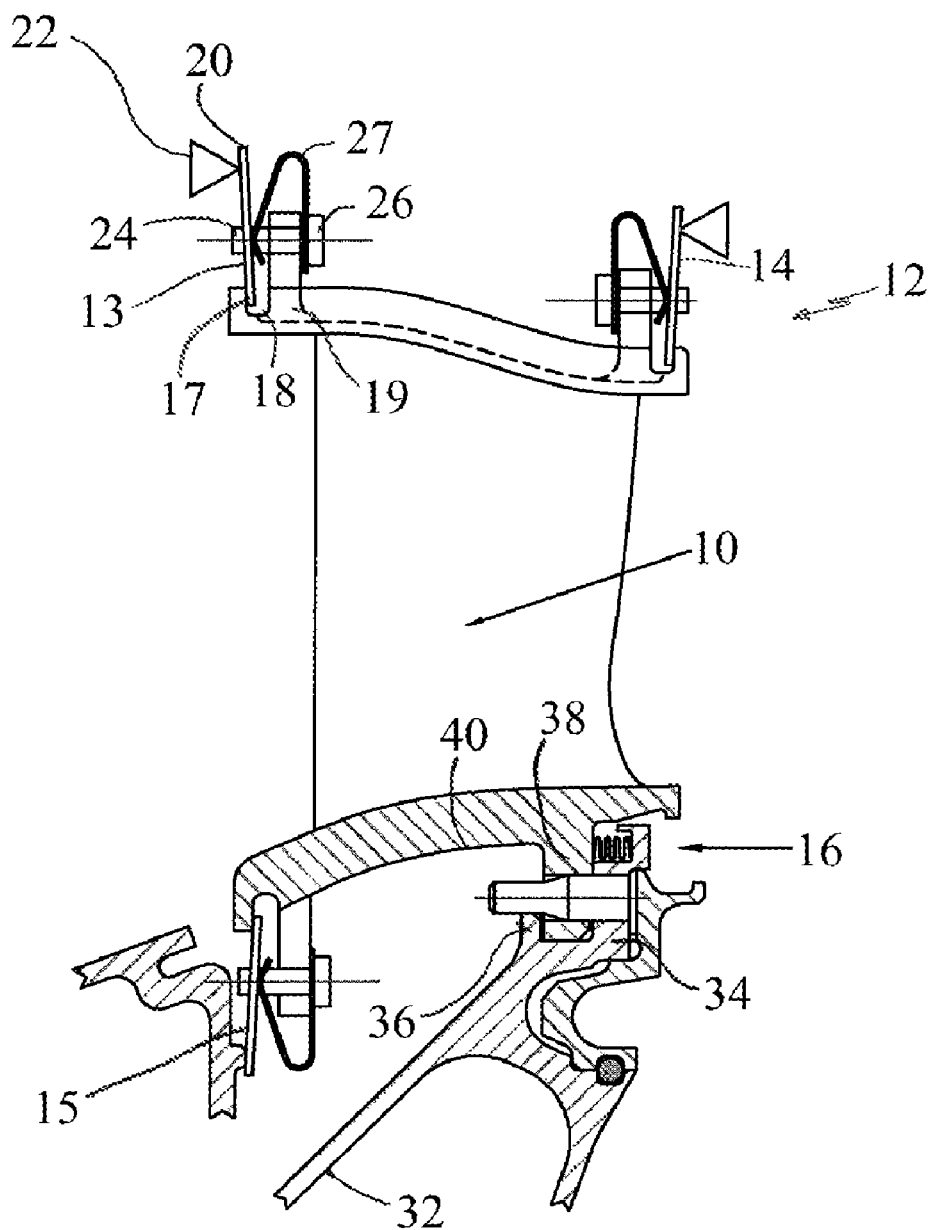
FIG. 1 is a cross-section through a turbine nozzle illustrating prior art sealing configurations.
Figure 2:
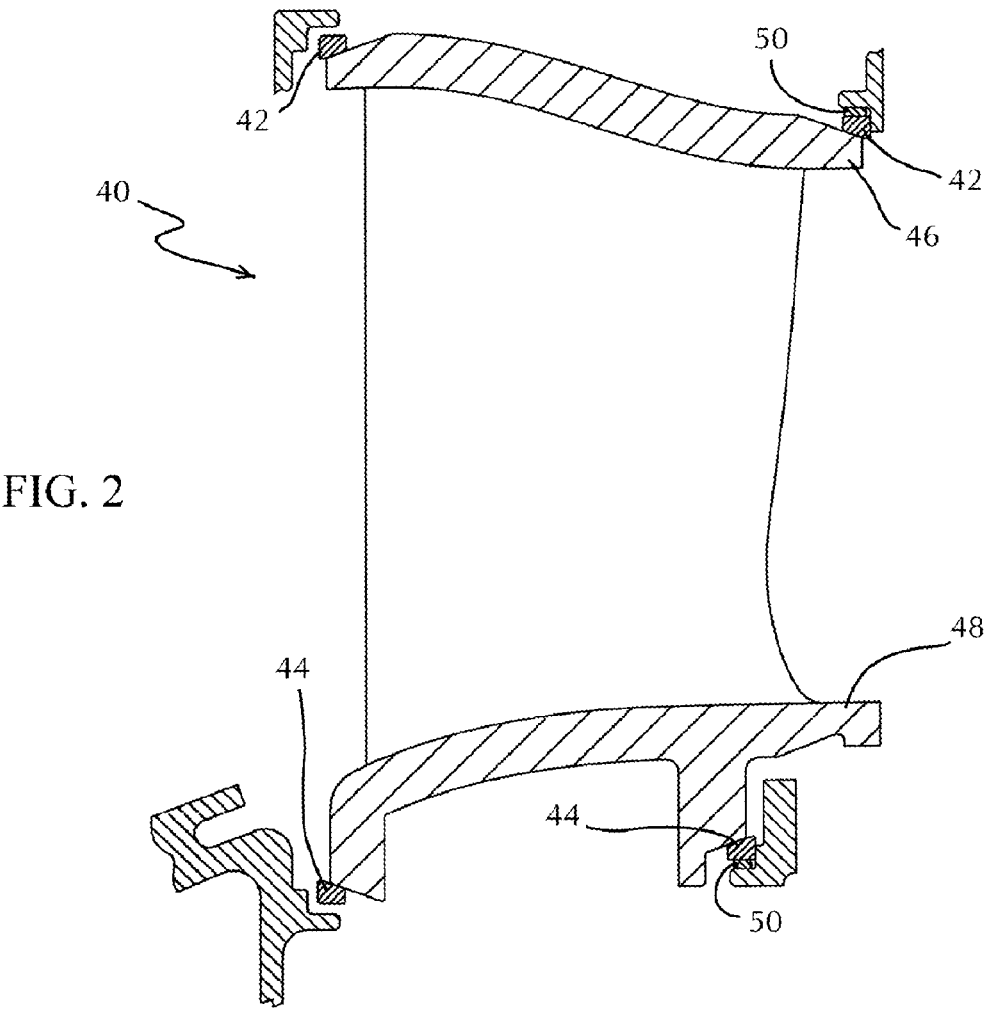
FIG. 2 is an illustration showing seals of the present invention and turbine nozzles configured for assembly.
Figures 3A, 3B:
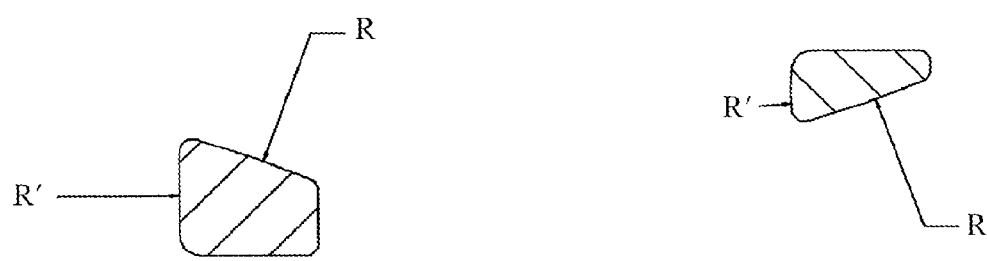
FIGS. 3A and 3B are illustrations of seal sections according to the present invention.

FIG. 2 depicts a cross-sectional view of a partially assembled nozzle segment 40 of the preferred embodiment. The placement of each sealing ring 42, 44 is shown at outer band 46 and inner band 48. A wax alignment spacer 50 may be used in conjunction with the sealing ring to ensure proper fitting within the assembly environment. FIG. 3A illustrates the basic cross-section of one embodiment of the cone wedge ring seal 42, 44. FIG. 3B is a cross-section of an alternative embodiment of the cone wedge ring seal.

Of the axial distal ends of the ring, the larger diameter end, which engages a flat annular surface on the adjacent structural member, may be slightly crowned, and is generally perpendicular to the ring axis, while the smaller diameter end, which does not engage a sealing surface, is flat and generally perpendicular to the ring axis.

The sealing rings of the present invention fit into annular, outwardly tapering grooves formed by machining ends of the turbine nozzle ring segments, and their upstream and downstream neighboring components, such as the gas conduit and structural ring. To aid in maintaining concentricity between the downstream component groove and the seal during assembly of a segmented nozzle, the heat-destructible spacer of wax 50, or other non-toxic material, may be inserted or attached to the corresponding cylindrical diameter of the seal or groove before or during installation of the seal to hold it temporarily in place.

Figure 4:
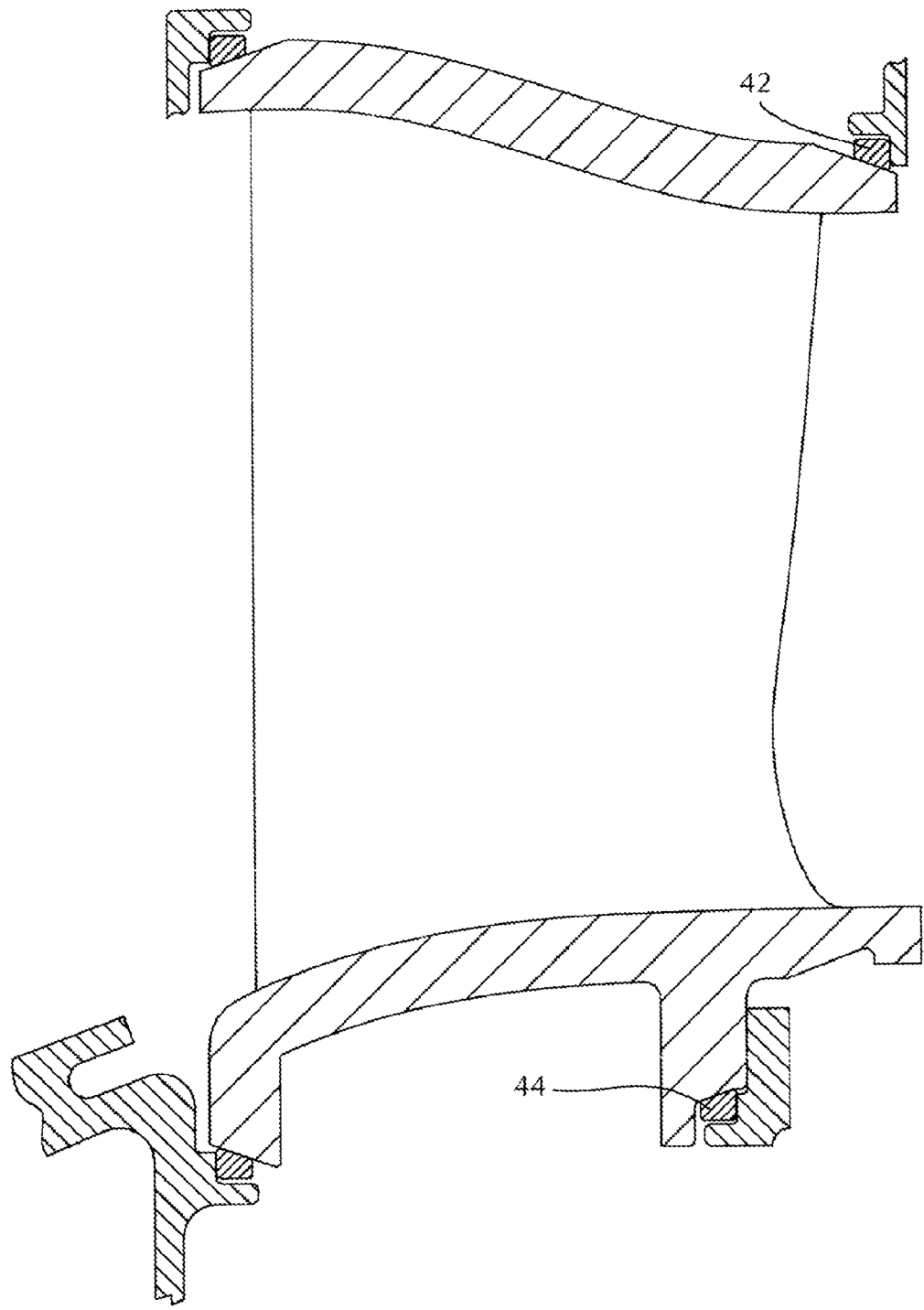
FIG. 4 is a simplified view of a refashioned nozzle segment and connecting components sealed by sealing rings according to the present invention, in a completed assembly.
Figure 5:
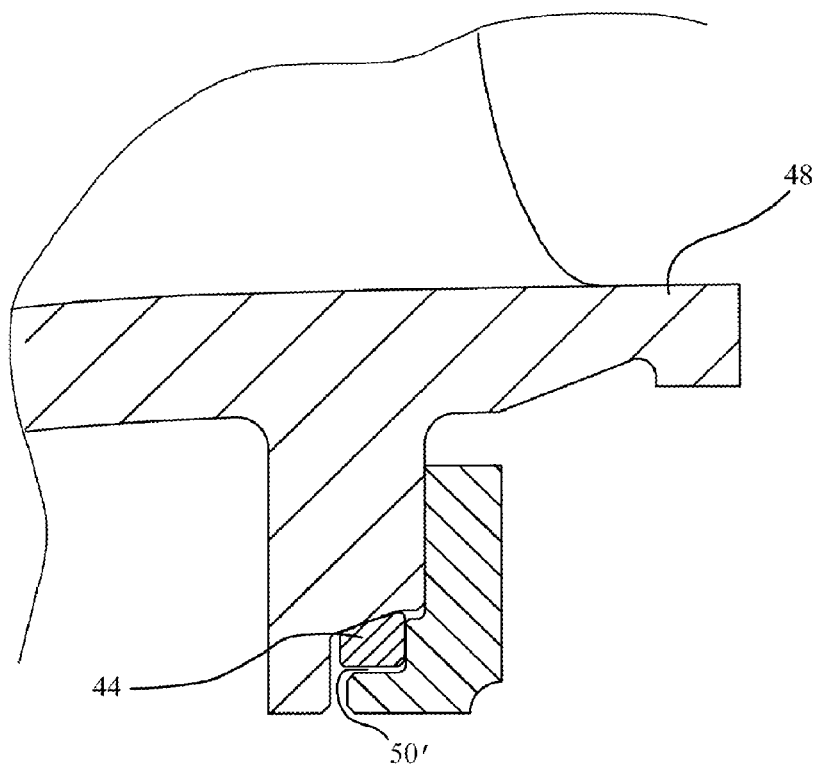
FIG. 5 is an enlarged view of one of the sealing areas depicted in FIG. 4 showing the radial clearance that exists after the wax has evaporated.

The dimensions of the seal and groove are arranged so that axial displacements are accommodated by an interference wedging action of their conical surfaces, radially expanding or contracting the seal. The seal is axially preloaded, to accommodate build tolerances and maintain sealing contact with sufficient force, when compressive and/or expansive thermal excursions occur both in the axial and radial directions. FIG. 4 depicts a cross-sectional view of a fully assembled nozzle segment, showing seated ring seals 42, 44. FIG. 5 is an enlarged view of one of the sealing areas depicted in FIG. 4 showing the radial clearance 50' that exists after the wax spacer has evaporated.

In any sealing system designed to operate against interrupted, stepped surfaces, some leakage is unavoidable. As demonstrated by the present invention, the seal of the preferred embodiment can be expected to provide a better sealing solution and greater integrity than the prior art leaf seals and seal assemblies.

Just as steps may exist in the planar surfaces at the interfaces of turbine nozzle segments, it is understood that steps may also exist between their cylindrical surfaces. By providing tension in external seals and compression in internal seals according to the present invention, it is possible to cause the seal rings to deflect into the pockets formed between higher and lower surfaces, thereby reducing the areas of these potential leakage paths. Any remaining leakage is forced to make a one hundred eighty (180°) degree turn in tight spaces to escape, thereby adding a labyrinth sealing effect.

In operation, thermal excursions are accompanied by fluctuations in pressure differences across the seals (differential pressures). The seals are oriented such that pressure differences augment sealing contact forces, increasing the effectiveness or sealing efficiency. For example, a typical seal exerting a contact force of eight (8) pounds per inch of circumference upon installation exerts a force of twenty-three (23) pounds per inch of circumference at a differential pressure of two hundred (200) psid.

In another embodiment, a sealing arrangement for a piston engine exhaust recirculation system is presented in which the seal diameter to cross-section ratio is at least one order of magnitude lower than the turbine nozzle embodiment described above. Suitable seal materials for these embodiments include ceramics with low coefficients of thermal expansion, in addition to certain metallic, intermetallic, or metal matrix composite materials.

Other applications where the present invention may be employed include situations that are less demanding in regard to axial deflection and extreme temperatures, but nevertheless involve operation at higher pressures. Examples of such applications include aerospace and automotive uses.

For example, it is known that high-performance automotive engines operate at high compression ratios, and that their head deflections sometimes exceed the capacity of conventional gaskets to maintain sealing. Various types of metallic-based seals have been tried in these applications, but none has been shown to be completely effective or long-lasting. The seal of the present invention is capable of performing in a high compression automotive application because a) stresses in the seal are low, allowing the seal to remain elastic, which is suitable for high duration use; b) the seal occupies an exceptionally high proportion of gland space for low, unswept volume; c) the seal conforms to head deflections with minimum alternating stress, minimizing fatigue stress cycles, resulting in a more robust fatigue-resistant seal; d) the seal is unaffected by coking, owing to its mode of responding to head deflections via small diametrical displacements with the preloaded state; e) the seal minimizes the effect of pressure impulses due to its geometric balancing; and f) the seal allows for longer operational time without the need for replacement and gland surface rework, which reduces maintenance costs.

Figure 6:
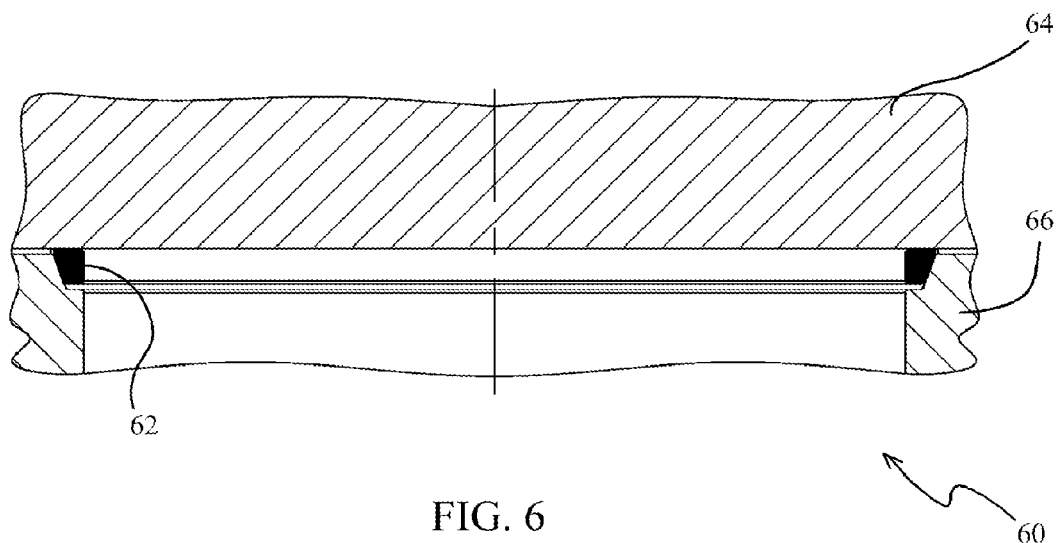
FIG. 6 is a simplified view of the seal of the present invention in an automotive application.

FIG. 6 depicts the seal of the present invention in an automotive application. Seal 62 is shown inserted for use within a piston-engine application 60. Seal 62 comprises surfaces of its upper and conical sides, both of which may be arcuate, rather than straight. Seal 60 upper surface contacts cylinder head 64, which generally includes apertures (not shown) for the injection of fuel, and an ignition source if pre-compression and ignition is not accomplished elsewhere. Gland 66, represents the lower part of piston-engine 60, which is often referred to as the cylinder block.

The diameters of seal 60 are made slightly larger than those of gland or block 66—such that when cylinder head 64 is tightened (bolted) to gland or block 66, seal 62b is reduced in diameter and thus generates vertical and radial pre-loading of its sealing surfaces.

As the automotive engine operates, the pressure of the gases inside the piston 60 rises and falls between the extremes of compression/combustion and exhaust. In some instances, the upper pressure is approximately as high as 3000 psia and the lower pressure may be close to 15 psia. The pressure extremes are substantial. Throughout the cycle, seal 62 is pressed into tighter radial contact with gland or block 66, which causes an increase in the contact pressure in both the conical and upper sealing contact area circumferences. The seal is thus forced to follow the deflected shape of the cylinder head while maintaining sealing in the gland or block space.

Cylinder head 64 bolting patterns are usually less than ideal because of the closeness of the cylinders, as well as the need to avoid excess weight and length of the engine. This results in lower unit circumference clamping force just where the effect of pressure is greatest, between adjacent cylinders. The seal or sealing ring 62 must be able to conform to the deflected head in this region while also maintaining its pressure in the regions with lesser deflection: In other words, it must be able to maintain sealing at all points along its sealing circumference while cyclically bending out of its initially flat plane.

In order to meet the preceding requirements, seal 62 must benefit from its radial compressive interaction with gland 66, and the axial force against the head. Should the pressure deflection of the head exceed the preload capability of the seal—which by design should not occur—additional capability is provided through pressure-energization of the seal, which is proportional to the pressure once the preload is overcome. For this to occur, the uncommon occurrence of under-tightening of the head bolts or stress-relaxation or fracture would be necessary.

Preferably, nickel-base alloy 718 is the material most suitable for seals of the present invention.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A seal for containment of gases during ultra high temperature operations between gas turbine nozzles downstream of a combustion chamber, separating a high pressure area on one side from a low pressure area on an opposite side, said seal formed to convert axial displacements into radial movements thereby eliminating axial strains, including two engaging, conical ring structures, each comprising:
   cross-sections with a tapering arcuate side facing radially away from said high pressure area;
   an axial distal end having a larger diameter than an opposite end for engaging a flat annular surface on an adjacent structural member;
   each of said conical ring structures has a side opposite said tapering arcuate side that is cylindrical with a cylindrical diameter that is concentric with said arcuate side; and
   at least one heat-destructible, approximately cylindrical wax spacer concentric with said conical ring structure, and positioned adjacent said conical ring structure, opposite said tapering arcuate side, to aid in correct positioning during assembly for subsequent high temperature operation.

2. The seal of claim 1 wherein said arcuate side of said conical ring structure is dimensioned to engage a tapered sealing surface on said turbine nozzle segment.

3. The seal of claim 1 wherein said ultra high temperature applications comprise sealing in an environment having a temperature greater than or equal to 2000° F. (1093° C.).

4. The seal of claim 1 including having said axial distal end crowned and substantially perpendicular to said conical ring structure axis.

5. The seal of claim 1 including having said wax spacer inserted with said seal within a groove in said gas turbine nozzle segment.

6. The seal of claim 1 including having a sealing diameter to cross-section ratio for piston engine exhaust recirculation systems at least one order of magnitude lower than that of said turbine nozzle application.

7. A seal for containment of fluids, separating a high pressure area on one side from a low pressure area on an opposite side, said seal formed to convert axial displacements into radial movements thereby eliminating axial strains, including at least one conical ring structure comprising:

a cross-section with a tapering arcuate side facing radially away from said high pressure area;

an axial distal end having a larger diameter than an opposite end for engaging a flat annular surface on an adjacent structural member, wherein said axial distal end is crowned and substantially perpendicular to said conical ring structure axis; and at least one heat-destructible, approximately cylindrical, wax spacer concentric with said conical ring structure, and positioned adjacent said conical ring structure, opposite said tapering arcuate side, to aid in positioning during high temperature application.

* * * * *